United States Patent
Gupta et al.

(10) Patent No.: US 10,628,305 B2
(45) Date of Patent: Apr. 21, 2020

(54) DETERMINING A DATA LAYOUT IN A LOG STRUCTURED STORAGE SYSTEM

(71) Applicant: International Business Machines Corporation, Armonk, NY (US)

(72) Inventors: Aayush Gupta, Santa Clara, CA (US); Sangeetha Seshadri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 15/153,771

(22) Filed: May 13, 2016

(65) Prior Publication Data

US 2017/0329705 A1    Nov. 16, 2017

(51) Int. Cl.
*G06F 3/06* (2006.01)
*G06F 12/02* (2006.01)
*G06F 12/0862* (2016.01)

(52) U.S. Cl.
CPC .......... *G06F 12/0253* (2013.01); *G06F 3/064* (2013.01); *G06F 3/0608* (2013.01); *G06F 3/0674* (2013.01); *G06F 12/0862* (2013.01); *G06F 2212/1044* (2013.01); *G06F 2212/602* (2013.01)

(58) Field of Classification Search
CPC ......... G06F 12/0254; G06F 2212/7205; G06F 12/0862; G06F 2212/602; G06F 17/30185
See application file for complete search history.

(56) References Cited

U.S. PATENT DOCUMENTS

| 5,416,915 A * | 5/1995 | Mattson ................ G06F 3/0601 711/114 |
| 5,551,003 A * | 8/1996 | Mattson ................ G06F 3/0601 711/112 |
| 7,426,605 B2 | 9/2008 | Rudelic |
| 9,460,008 B1 * | 10/2016 | Leshinsky ......... G06F 17/30185 |
| 9,678,861 B2 * | 6/2017 | Fair ........................ G06F 12/023 |
| 2011/0276781 A1 * | 11/2011 | Sengupta ............ G06F 12/0862 711/216 |
| 2013/0185475 A1 * | 7/2013 | Talagala .............. G06F 12/0866 711/102 |

(Continued)

OTHER PUBLICATIONS

Chiang, Mei-Ling, et al., "A new FTL-based Flash Memory Management Scheme with Fast Cleaning Mechanism," ICESS'08, pp. 205-214, IEEE, 2008.

(Continued)

*Primary Examiner* — Pierre Miche Bataille
(74) *Attorney, Agent, or Firm* — Lieberman & Brandsdorfer, LLC

(57) ABSTRACT

Embodiments are provided for organizing data elements in a log-structured storage system. A profile is created based on a population of data elements in cache memory related to a log structured storage system. A layout for storage of the data elements on persistent storage related to the log-structured storage system is determined, which includes identifying two or more related data elements based on the profile. A garbage collection process is performed on the persistent storage based on the determined layout, which includes placing the related data elements within substantially close proximity on the persistent storage.

19 Claims, 3 Drawing Sheets

(56) References Cited

U.S. PATENT DOCUMENTS

2014/0095775 A1* 4/2014 Talagala .............. G06F 12/0866
                                                            711/103
2014/0281260 A1* 9/2014 Peterson ............... G06F 3/0616
                                                            711/135
2014/0359228 A1   12/2014 Hu et al.

OTHER PUBLICATIONS

Chiang, Mei-Ling, et al., "Partitioned Log-Based Flash Memory Management and Adaptive Cleaning," International Symposium on Consumer Electronics, 2000, 9 pages.

Min Changwoo, et al., "Design and Implementation of a Log-Structured File System for Flash-Based Solid State Drives," IEEE Transactions on Computers 63, No. 9, 2014, pp. 2215-2227.

Jo, Heeseung, et al., "FAB: Flash-Aware Buffer Management Policy for Portable Media Players," IEEE Transactions on Consumer Electronics 52, No. 2, 2006, pp. 485-493.

* cited by examiner

DETERMINING A DATA LAYOUT IN A LOG STRUCTURED STORAGE SYSTEM

BACKGROUND OF THE INVENTION

Technical Field

The embodiments described herein relate to data storage. More specifically, the embodiments relate to leverage data cache to organize data elements in a log-structured storage system.

Description of the Prior Art

As is known in the art, a log-structured storage system (LSS) is a storage system in which data and metadata are written sequentially. Specifically, when writing a data block to a disk, such as a persistent storage device, the LSS buffers updates into a grouping called a segment and, when the segment is sufficiently full, writes the segment sequentially to an unused portion of the disk in a single operation. Although the write process is efficient, live versions of data are repeatedly written to new locations on the disk without overwriting older versions of the data. These older versions of data may be referred to as garbage. Accordingly, through the write process, garbage is stored and scattered throughout the disk.

In order to clean out these older versions of the data that are scattered throughout the disk, the LSS implements a protocol to periodically perform a background process known as garbage collection. The garbage collection process operates to "collect" the garbage and reclaim free space on the disk. The garbage collection process is performed on a segment-by-segment basis to prevent fragmentation. In one embodiment, the garbage collection process compacts recent versions of data blocks. For example, the LSS may read segments of data blocks, determine which data blocks in the segments correspond to recent versions, and compact the recent versions into new segments to reclaim disk space. Determining which data blocks are recent is known in the art, and a further description of the determination will not be provided herein. The granularity of garbage collection is large, and may be on the order of megabytes or gigabytes.

SUMMARY

The aspects described herein include a system, computer program product, and method for organizing data elements in a log-structured storage system.

According to one aspect, a system is provided to organize data elements in a log-structured storage system. The system includes a log-structured storage system including cache memory and persistent storage. A processor is in communication with memory. One or more tools are in communication with the processor to create a profile based on a population of data elements in the cache memory. A layout for storage of the data elements on the persistent storage is determined, which includes the tools to identify two or more related data elements based on the profile. A garbage collection process is performed on the persistent storage based on the determined layout, which includes the tools to place the related data elements within substantially close proximity on the persistent storage.

According to another aspect, a computer program product is provided to organize data elements in a log-structured storage system. The computer program product includes a computer-readable storage medium have computer-readable program code embodied therewith. The program code is executable by a processor to create a profile based on a population of data elements in cache memory related to a log-structured storage system. A layout for storage of the data elements on persistent storage related to the log-structured storage system is determined, which includes the tools to identify two or more related data elements based on the profile. A garbage collection process is performed on the persistent storage based on the determined layout, which includes the tools to place the related data elements within substantially close proximity on the persistent storage.

According to yet another aspect, a method is provided for organizing data elements in a log-structured storage system. A profile is created based on a population of data elements in cache memory related to a log structured storage system. A layout for storage of the data elements on persistent storage related to the log-structured storage system is determined, which includes identifying two or more related data elements based on the profile. A garbage collection process is performed on the persistent storage based on the determined layout, which includes placing the related data elements within substantially close proximity on the persistent storage.

Other features and advantages of will become apparent from the following detailed description of the presently preferred embodiments, taken in conjunction with the accompanying drawings.

BRIEF DESCRIPTION OF THE DRAWINGS

The drawings referenced herein form a part of the specification. Features shown in the drawing are meant as illustrative of only some of the embodiments, and not of all of the embodiments unless otherwise explicitly indicated. Implications to the contrary are otherwise not to be made.

DETAILED DESCRIPTION OF THE EMBODIMENTS

Figure 1:
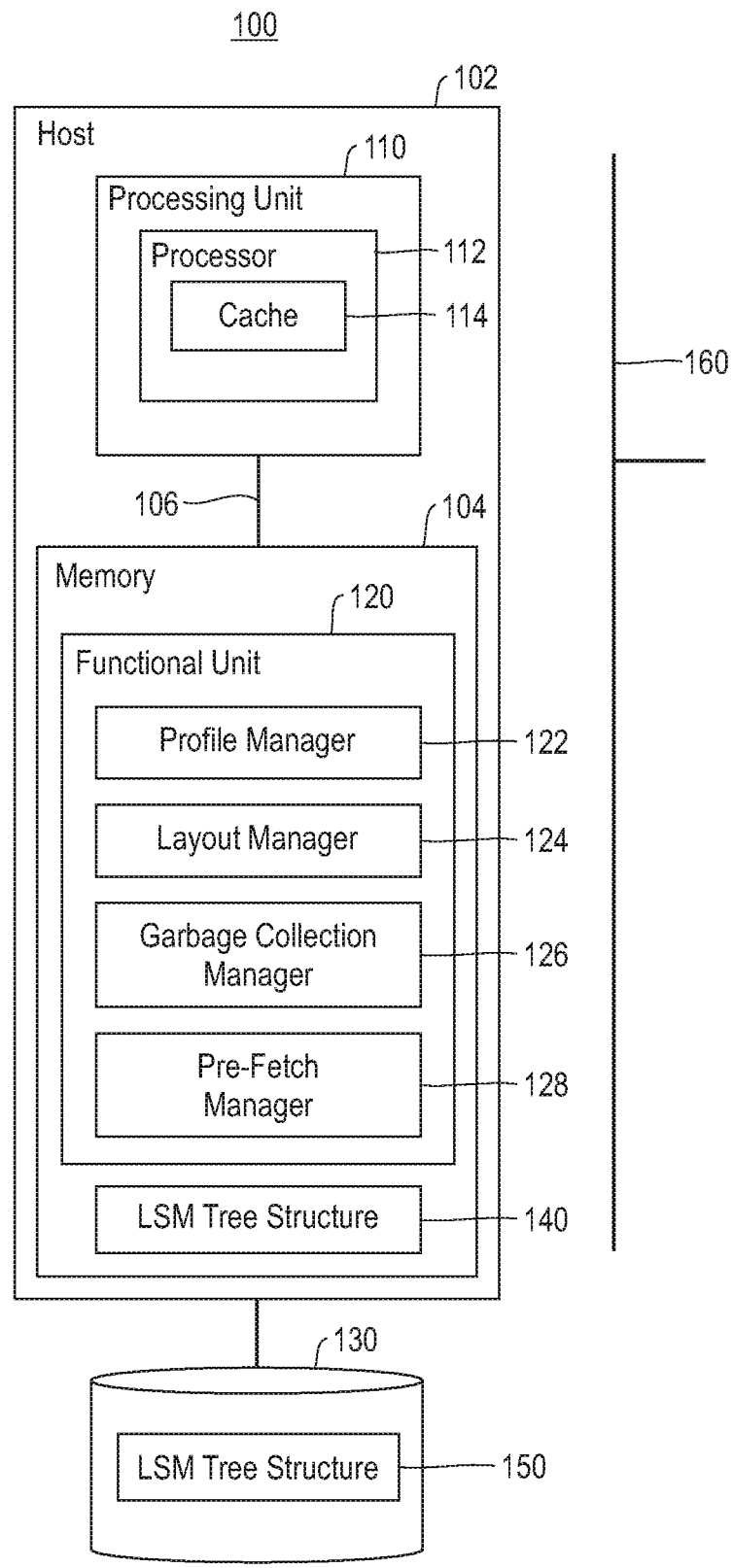
FIG. 1 depicts a block diagram illustrating tools to organize data elements in a log-structured storage system.

It will be readily understood that the components, as generally described and illustrated in the Figures herein, may be arranged and designed in a wide variety of different configurations. Thus, the following detailed description of the embodiments of the apparatus, system, and method, as presented in the Figures, is not intended to limit the scope of the claims, but is merely representative of select embodiments.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of an analysis manager, a recommendation manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A log-structured storage systems (LSS) may be used to organize data elements on a persistent storage device. The LSS may be designed for storage of "small" objects. Typically, a small object has a size on the order of tens or hundreds of bytes. In other words, a small object typically has a size under a kilobyte. In one embodiment, the LSS is a key-value store, such that the data elements of the LSS comprise keys. For example, in one embodiment, the LSS may be used to organize small key-value records on a flash storage device.

In one embodiment, the LSS is a log-structured merge (LSM) tree based storage system. In general, an LSM tree is a data structure that provides indexed access to files with high insert volume, such as transactional log data. Like other search trees, the log-structured merge tree maintains key-value pairs. However, LSM trees are designed to provide better write throughput than other indexing approaches by removing the need to perform random update-in-place operations. In one embodiment, log-structured merge tree data is maintained in two or more separate structures in respective underlying storage media. Data between the two or more structures may then be synchronized. In one embodiment, the synchronization is performed by saving batches of writes sequentially to a set of smaller index files. Each file is sorted prior to being written, with the sorting decreasing a future search time. Accordingly, an LSM tree manages a group of index files, as opposed to single files, thereby increasing throughput by trading random I/O for sequential I/O.

For example, in a simple two-level LSM tree, one structure may reside in main memory (e.g., random access memory or RAM), and another structure may reside on a persistent data storage device, such as a disk. As a new record is inserted into the in-memory LSM tree structure, a sequence of entries from the in-memory LSM tree structure is merged onto the in-disk LSM tree structure if the new record causes the LSM tree structure to exceed a size threshold. Accordingly, the LSM tree applies a merge-based algorithm to migrate data between levels of storage media.

With reference to FIG. 1, a block diagram (100) is provided illustrating a computer system/server (102), hereinafter referred to as a host (102), having tools to organize data in a log-structured storage system. In one embodiment, the log-structured storage system is a log-structured merge (LSM) tree based storage system. The host (102) includes a processing unit (110) in communication with memory (104) across a bus (106). In one embodiment, the memory (104) includes an in-memory LSM tree structure (140). The processing unit (110) is shown including at least one processor, processor (112), and cache memory (114). The host (102) is provided in communication with data storage (130). In one embodiment, the data storage (130) includes a LSM tree structure (150), also referred to herein as an in-disk LSM tree. Data may be stored on the data storage (130), or in one embodiment may be available through remote data storage (not shown) available across a network (160).

A functional unit (120) is provided embedded in memory (104), and includes one or more managers or tools to support functionality associated with organizing data elements in a log-structured storage system. The tools include, but are not limited to, a profile manager (122), a layout manager (124), and a garbage collection manager (126). In one embodiment, the tools further include a pre-fetch manager (128). The tools may be implemented in programmable hardware devices such as field programmable gate arrays, programmable array logic, programmable logic devices, or the like. The tools may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the manager and achieve the stated purpose of the manager. Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

The profile manager (122) creates a profile of logged cache data. More specifically, the profile is based on a population of data elements in the cache memory (114), also referred to herein as a cache population profile. The cache population profile may comprise access pattern information associated with data elements stored in the cache memory (114). Data stored in the cache memory (114) may be employed to efficiently support an I/O request. As cache data is added or removed from the cache memory (114), the associated cache population profile is amended. In other words, the cache population profile changes based on access to data residing in the cache memory (114).

The layout manager (124) determines a layout for storage of the data elements on the data storage (130). The layout manager (124) is shown in communication with the profile manager (122) to identify two or more related data elements based on the cache population profile. In one embodiment, the layout manager (124) determines the layout by observing temporal and behavior driven spatial access patterns of the population of data elements in the cache memory (114) based on the profile. The layout manager (124) may then identify the two or more related data elements by determining a temporal relationship based on access times associated with each data element of the population. In one embodiment, data elements identified as or considered related are elements that are frequently accessed together. Accordingly, the profile manager (122) creates a profile, and the layout manager (124) utilizes the profile to determine an appropriate layout for storage of the data elements.

The layout determined by the layout manager (124) may then be utilized by the garbage collection manager (126) to perform a garbage collection process for the log-structured storage system. The garbage collection manager (126) performs the garbage collection process by placing the related data elements in substantially close proximity on a persistent storage device of the log-structured storage system. In one embodiment, performing the garbage collection process further comprises the garbage collection manager (126) to reorganize the data elements of the data storage (120), and reclaim space in the data storage (120) in response to the reorganization. Accordingly, a cache population profile reorganizes data in a log-structured storage system during garbage collection.

The pre-fetch manager (128) may be provided to pre-fetch the two or more related data elements in the cache memory (114). Pre-fetching occurs when a processor requests data before it is actually needed by placing it in the cache memory. By placing the related data elements in substantially close proximity on the persistent storage device, and pre-fetching the related data elements to the cache memory (114), a warm-up rate of the cache memory (114) is improved.

Figure 2:
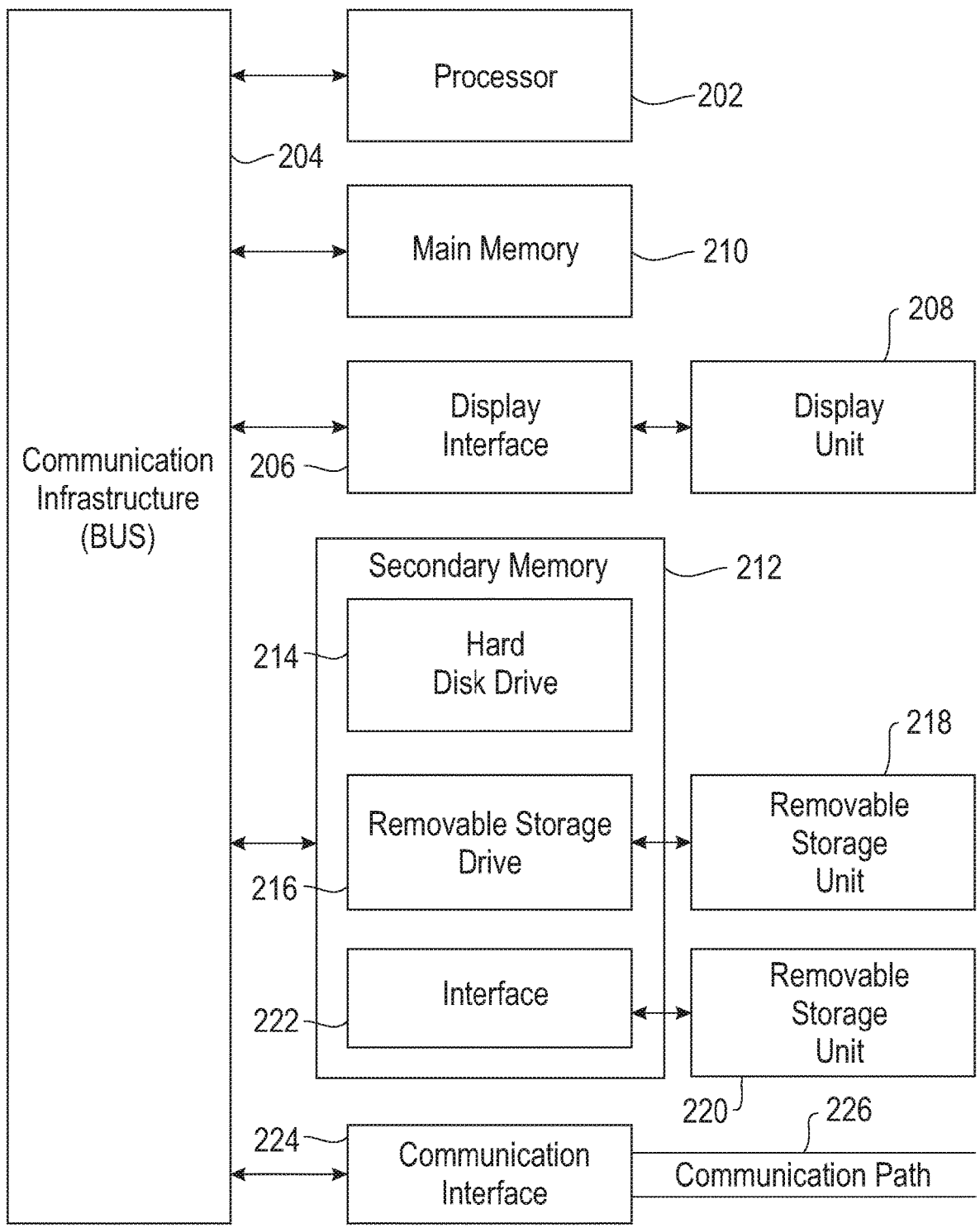
FIG. 2 depicts a block diagram illustrating a system to implement the tools of FIG. 1.

Referring now to FIG. 2, a block diagram (200) is provided illustrating an exemplary computer system for hosting a log-structured storage system. The computer system includes one or more processors, such as processor (202). Processor (202) is connected to communication infrastructure (204) (e.g., a communication bus, cross-over bar, network, etc.).

The computer system can include a display interface (206) that forwards graphics, text, and other data from the communication infrastructure (204) (or from a frame buffer not shown) for display on a display unit (208). The computer system also includes a main memory (210), preferably random access memory (RAM), and may also include a secondary memory (212). The secondary memory (212) may include, for example, a persistent storage device, such as hard disk drive (214) (or alternative persistent storage device) and/or a removable storage drive (216), representing, for example, a floppy disk drive, a magnetic tape drive, or an optical disk drive. The removable storage drive (216) reads from and/or writes to a removable storage unit (218) in a manner well known to those having ordinary skill in the art. Removable storage unit (218) represents, for example, a floppy disk, a compact disc, a magnetic tape, or an optical disk, etc., which is read by and written to by a removable storage drive (216). As will be appreciated, the removable storage unit (218) includes a computer readable medium having stored therein computer software and/or data.

In alternative embodiments, the secondary memory (212) may include other similar means for allowing computer programs or other instructions to be loaded into the computer system. Such means may include, for example, a removable storage unit (220) and an interface (222). Examples of such means may include a program package and package interface (such as that found in video game devices), a removable memory chip (such as an EPROM, or PROM) and associated socket, and other removable storage units (220) and interfaces (222) which allow software and data to be transferred from the removable storage unit (220) to the computer system.

The computer system may also include a communications interface (224). Communications interface (224) allows software and data to be transferred between the computer system and external devices. Examples of communications interface (224) may include a modem, a network interface (such as an Ethernet card), a communications port, or a PCMCIA slot and card, etc. Software and data transferred via communications interface (224) are in the form of signals which may be, for example, electronic, electromagnetic, optical, or other signals capable of being received by communications interface (224). These signals are provided to communications interface (224) via a communications path (i.e., channel) (226). This communications path (226) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (210) and secondary memory (212), removable storage drive (216), and persistent storage device (214). Computer programs (also called computer control logic) are stored in main memory (210) and/or secondary memory (212). Computer programs may also be received via a communication interface (224). Such computer programs, when run, enable the computer system to perform the features of the present invention as discussed herein. In particular, the computer programs, when run, enable the processor (202) to perform the features of the computer system. Accordingly, such computer programs represent controllers of the computer system.

Figure 3:
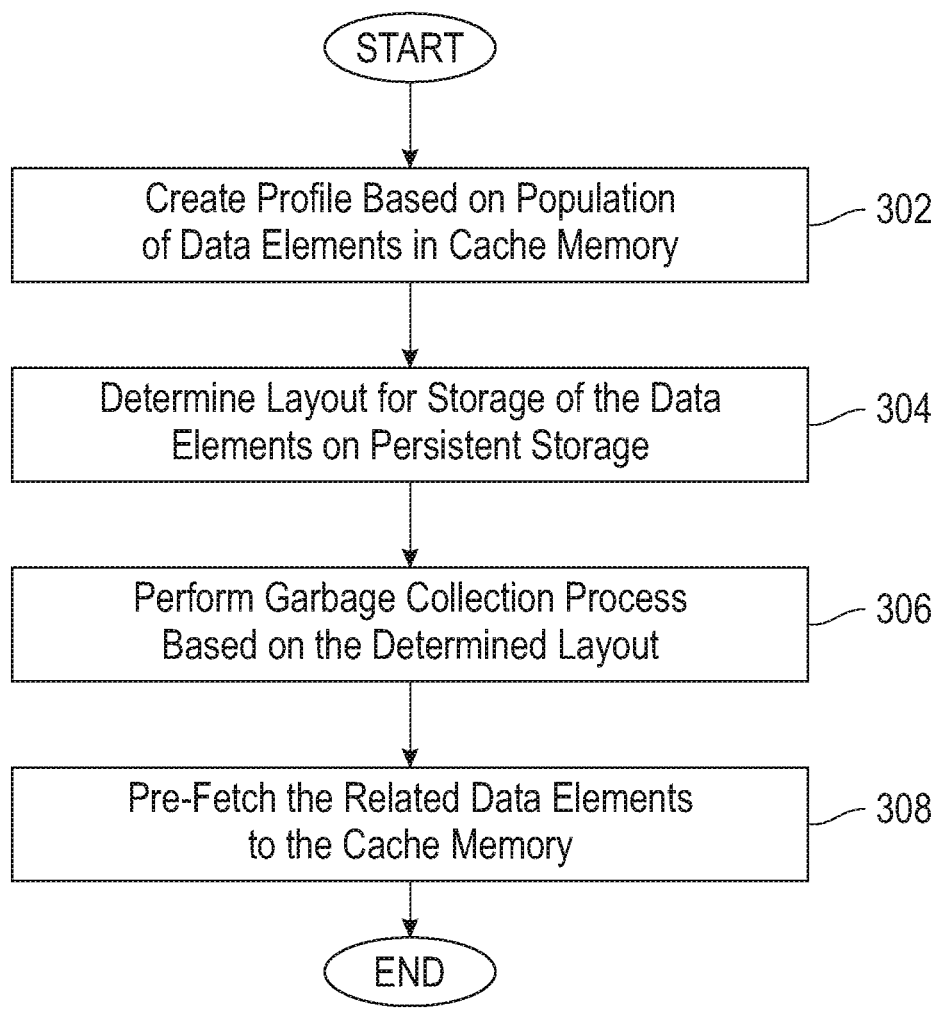
FIG. 3 depicts a flow chart illustrating a process for organizing data elements in a log-structured storage system.

Referring to FIG. 3, a flow chart (300) is provided illustrating a process for determining a data layout in a log-structured storage system (LSS). A profile is created based on a population of data elements in cache memory of the LSS (302). The cache population profile may comprise access pattern information associated with data elements stored in the cache memory. Using the profile created at step (302), a layout for storage of the data elements on persistent storage is determined (304). In one embodiment, the layout is determined at step (304) by observing the access pattern information, and identifying two or more related data elements based on the observation. The access pattern information may include information associated with temporal and behavior driven spatial access patterns. When a data element is populated in cache memory, other data elements which are read from persistent storage may also be populated in the cache memory since they have a relatively high chance of being accessed soon (i.e., they have temporal locality). Accordingly, the two or more related data elements may be identified by determining a temporal relationship based on access times associated with each data element of the population.

The layout determined at step (304) may be used to optimize garbage collection performed on the LSS. A garbage collection process is performed on the LSS based on the determined layout (306). The garbage collection process at step (306) includes placing the related data elements in substantially close proximity on the persistent storage. Step (306) may further include reorganizing the data elements of the persistent storage, and reclaiming space in the persistent storage in response to the reorganization.

Steps (302)-(306) operate to improve the efficiency of the LSS during garbage collection. For instance, placing related data elements together may improve the cache hit rate. The improved cache hit rate reduces the request rate to the persistent storage device, thereby reducing contention during garbage collection. Furthermore, steps (302)-(306) allow the garbage collection process to make non-trivial decisions in order to reduce access latency (e.g., storing temporally related data elements together to lessen seek overhead). If the cache memory is write-back cache memory, storing the temporally related data together may help reduce fragmentation on the persistent storage device. For instance, it may help improve endurance in the case of a NAND flash-backed log-structured store. Accordingly, the process of identifying and grouping related data elements together as discussed above improves data management efficiency in a log-structured storage system.

In one embodiment, the related data elements may be pre-fetched to the cache memory (308). Pre-fetching occurs when a processor requests data before it is actually needed by placing it in the cache memory. By placing the related data elements in substantially close proximity on the persistent storage device, and pre-fetching the related data elements to the cache memory, the process of FIG. 3 improves a warm-up rate of the cache memory. Accordingly, the process of FIG. 3 may improve cache population efficiency and pre-fetch efficiency by reducing wasted bandwidth during cache memory population, and effectively increasing the speed of the cache memory warm-up.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The corresponding structures, materials, acts, and equivalents of all means or step plus function elements in the claims below are intended to include any structure, material, or act for performing the function in combination with other claimed elements as specifically claimed. The description of the embodiments herein has been presented for purposes of illustration and description, but is not intended to be exhaustive or limited to the embodiments in the forms disclosed. Many modifications and variations will be apparent to those of ordinary skill in the art without departing from the scope and spirit of the embodiments described herein. The embodiments were chosen and described in order to best explain the principles and the practical application, and to enable others of ordinary skill in the art to understand the various embodiments with various modifications as are suited to the particular use contemplated. Accordingly, the implementation of a cache population profile shown and described herein provides for a performance of an efficient garbage collection process within a log-structured storage system.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

We claim:

1. A method comprising:
   creating a profile based on a population of data elements in non-volatile semiconductor cache memory related to a log-structured storage system, wherein the cache memory comprises at least one segment;
   determining a layout for storage of the data elements on non-volatile semiconductor log-structured persistent storage related to the log-structured storage system, including identifying two or more related data elements based on the profile; and
   performing a garbage collection process on the persistent storage based on the determined layout, including placing the related data elements within the at least one segment of the cache memory and placing the related data elements from the at least one segment of the cache memory sequentially on the persistent storage.

2. The method of claim 1, wherein the log structured storage system is a key-value storage system, and wherein the data elements are keys.

3. The method of claim 1, wherein determining the layout comprises observing temporal and behavior driven spatial access patterns of the data elements in the population, and wherein identifying the two or more related data elements comprises determining that the two or more data elements are temporally related based on access times associated with each data element.

4. The method of claim 3, wherein the related data elements are data elements that are frequently accessed together.

5. The method of claim 1, wherein performing the garbage collection process further comprises reorganizing the data elements of the persistent storage, and reclaiming space in the persistent storage in response to the reorganization.

6. The method of claim 1, further comprising pre-fetching the two or more related data elements to the cache memory, wherein the pre-fetching improves a warm-up rate of the cache memory.

7. The method of claim 1, further comprising populating the non-volatile semiconductor cache memory with data elements read from the non-volatile semiconductor persistent storage responsive to a determination that the data elements read from the persistent storage are related to data elements in the cache memory.

8. A system comprising:
   a log-structure storage system comprising non-volatile semiconductor cache memory and non-volatile semiconductor log-structured persistent storage, wherein the non-volatile semiconductor cache memory comprises at least one segment;
   a processor in communication with the log-structured storage system; and
   one or more tools in communication with the processor, the tools to:
   create a profile based on a population of data elements in the cache memory;

determine a layout for storage of the data elements on the persistent storage, including the tools to identify two or more related data elements based on the profile; and perform a garbage collection process on the persistent storage based on the determined layout, including the tools to place the related data elements within the at least one segment of the cache memory and place the related data elements from the at least one segment of the cache memory sequentially on the persistent storage.

9. The system of claim 8, wherein the log structured storage system is a key-value storage system, and wherein the data elements are keys.

10. The system of claim 8, wherein determining the layout comprises the tools to observe temporal and behavior driven spatial access patterns of data elements in the population, and wherein identifying the two or more related data elements comprises the tools to determine that the two or more data elements are temporally related based on access times associated with each data element.

11. The system of claim 10, wherein the related data elements are data elements that are frequently accessed together.

12. The system of claim 8, wherein performing the garbage collection process further comprises the tools to reorganize the data elements of the persistent storage, and reclaim space in the persistent storage in response to the reorganization.

13. The system of claim 8, further comprising the tools to pre-fetch the two or more related data elements to the cache memory, wherein the pre-fetch improves a warm-up rate of the cache memory.

14. A computer program product comprising a computer-readable hardware storage device having computer-readable program code embodied therewith, the program code executable by a processor to:

create a profile based on a population of data elements in non-volatile semiconductor cache memory related to a log-structured storage system, wherein the cache memory comprises at least one segment;

determine a layout for storage of the data elements on non-volatile semiconductor log-structured persistent storage related to the log-structured storage system, including program code to identify two or more related data elements based on the profile; and perform a garbage collection process on the persistent storage based on the determined layout, including program code to place the related data elements within the at least one segment of the cache memory and place the related data elements from the at least one segment of the cache memory sequentially on the persistent storage.

15. The computer program product of claim 14, wherein the log-structured storage system is a key-value storage system, and wherein the data elements are keys.

16. The computer program product of claim 14, wherein determining the layout comprises program code to observe temporal and behavior driven spatial access patterns of the data elements in the cache memory, and wherein identifying the two or more related data elements comprises program code to determine that the two or more data elements are temporally related based on access times associated with each data element.

17. The computer program product of claim 16, wherein the related data elements are data elements that are frequently accessed together.

18. The computer program product of claim 14, wherein performing the garbage collection process further comprises program code to reorganize the data elements of the persistent storage, and reclaim space in the persistent storage in response to the reorganization.

19. The computer program product of claim 14, further comprising program code to pre-fetch the two or more related data elements to the cache memory, wherein the pre-fetch improves a warm-up rate of the cache memory.

* * * * *